(12) United States Patent
Gommé et al.

(10) Patent No.: US 9,774,096 B2
(45) Date of Patent: Sep. 26, 2017

(54) ELECTROMAGNETIC FIELD INDUCTION FOR INTER-BODY AND TRANSVERSE BODY COMMUNICATION

(71) Applicant: NXP B.V., Eindhoven (NL)

(72) Inventors: Liesbeth Gommé, Heverfee (BE); Anthony Kersalaers, Louvain (BE)

(73) Assignee: NXP B.V., Eindhoven (NL)

( * ) Notice: Subject to any disclaimer, the term of this patent is extended or adjusted under 35 U.S.C. 154(b) by 60 days.

(21) Appl. No.: 14/551,988

(22) Filed: Nov. 24, 2014

(65) Prior Publication Data

US 2016/0149313 A1    May 26, 2016

(51) Int. Cl.
| | | |
|---|---|---|
| *H01Q 21/00* | (2006.01) | |
| *H01Q 7/00* | (2006.01) | |
| *H01Q 1/22* | (2006.01) | |

(52) U.S. Cl.
CPC .......... *H01Q 21/00* (2013.01); *H01Q 1/2208* (2013.01); *H01Q 7/005* (2013.01)

(58) Field of Classification Search
CPC .... H01Q 21/28; H01Q 5/0006; H01Q 5/0072; H01Q 21/24; H01Q 21/30
USPC ......... 343/725, 702; 455/41.1, 100; 340/333
See application file for complete search history.

(56) References Cited

U.S. PATENT DOCUMENTS

| | | |
|---|---|---|
| 3,766,476 A | 10/1973 | Silitch |
| 4,334,315 A | 6/1982 | Ono |
| 4,692,743 A | 9/1987 | Holden |
| 5,673,054 A | 9/1997 | Hama |
| 5,708,732 A | 1/1998 | Merhav et al. |
| 5,907,522 A | 5/1999 | Teodoridis |
| 5,914,701 A | 6/1999 | Gersheneld |
| 5,926,573 A | 7/1999 | Kim et al. |
| 5,948,006 A | 9/1999 | Mann |
| 6,104,913 A | 8/2000 | McAllister |
| 6,211,799 B1 | 4/2001 | Post et al. |
| 6,223,018 B1 | 4/2001 | Fukumoto et al. |
| 6,275,737 B1 | 8/2001 | Mann |
| 6,424,820 B1 | 7/2002 | Burdick et al. |

(Continued)

FOREIGN PATENT DOCUMENTS

| | | |
|---|---|---|
| CN | 102013895 A | 4/2011 |
| CN | 102570000 A | 7/2012 |

(Continued)

OTHER PUBLICATIONS

Final Office Action mailed Aug. 27, 2015 for U.S. Appl. No. 14/270,013, 17 pages.

(Continued)

*Primary Examiner* — Huedung Mancuso (57) ABSTRACT

A electromagnetic induction wireless communication system including: a magnetic antenna; an electric antenna; a tuning capacitor coupled to the antenna combination configured to tune the antenna combination; a controller configured to control the operation of the communication system; a signal source coupled to the controller configured to produce a communication signal used to drive the magnetic antenna and the electric antenna; a voltage control unit coupled to the signal source configured to produce one of an amplitude difference, phase difference, and an amplitude and a phase difference between the communication signal used to drive the magnetic antenna and electric antenna.

20 Claims, 7 Drawing Sheets

(56) References Cited

U.S. PATENT DOCUMENTS

| | | | |
|---|---|---|---|
| 6,754,472 B1 | 6/2004 | Williams | |
| 6,816,600 B1 | 11/2004 | Jakob | |
| 7,142,681 B2 | 11/2006 | Kortekaas | |
| 7,171,177 B2 * | 1/2007 | Park | H04B 13/005 340/573.1 |
| 7,206,423 B1 | 4/2007 | Feng et al. | |
| 7,254,246 B2 | 8/2007 | Jakob | |
| 7,509,092 B2 | 3/2009 | Ishibashi et al. | |
| 7,664,476 B2 * | 2/2010 | Yanagida | H04B 13/005 340/522 |
| 7,684,769 B2 * | 3/2010 | Song | H04B 13/005 455/100 |
| 7,783,067 B1 | 8/2010 | Frerking | |
| 7,796,943 B2 | 9/2010 | Levan | |
| 7,907,057 B2 | 3/2011 | Schaffler et al. | |
| 8,005,547 B2 | 8/2011 | Forsberg | |
| 8,237,622 B2 | 8/2012 | Furumura et al. | |
| 8,265,554 B2 | 9/2012 | Hwang | |
| 8,280,302 B2 | 10/2012 | Kubono | |
| 8,401,470 B2 | 3/2013 | Kroekenstoel et al. | |
| 8,452,234 B2 * | 5/2013 | Hasegawa | H04B 5/0012 455/41.1 |
| 8,509,689 B2 * | 8/2013 | Nakamura | H04B 13/005 340/333 |
| 8,526,879 B2 | 9/2013 | Kristiansen | |
| 8,606,177 B2 | 12/2013 | Hwang | |
| 8,644,542 B2 | 2/2014 | Klemenz | |
| 8,797,148 B2 | 8/2014 | Kato et al. | |
| 8,829,725 B2 | 9/2014 | Urano | |
| 8,878,735 B2 | 11/2014 | Kvist et al. | |
| 8,892,055 B2 | 11/2014 | Gasperi | |
| 8,909,966 B2 | 12/2014 | Furukawa | |
| 9,019,131 B2 | 4/2015 | Kim | |
| 9,024,725 B2 | 5/2015 | Ikemoto | |
| 9,083,391 B2 | 7/2015 | Teggatz | |
| 9,130,273 B2 | 9/2015 | Kataoka | |
| 9,197,986 B1 | 11/2015 | Kerselaers et al. | |
| 9,314,381 B2 | 4/2016 | Curran et al. | |
| 9,455,771 B2 * | 9/2016 | Dobyns | H04B 5/0081 |
| 9,647,462 B2 | 5/2017 | Angst et al. | |
| 2002/0003503 A1 | 1/2002 | Justice | |
| 2002/0181579 A1 | 12/2002 | Vetro et al. | |
| 2004/0023216 A1 | 2/2004 | Lu et al. | |
| 2004/0027296 A1 | 2/2004 | Gerber | |
| 2004/0138723 A1 | 7/2004 | Malick et al. | |
| 2005/0058201 A1 | 3/2005 | Fernandes | |
| 2006/0008038 A1 | 1/2006 | Song et al. | |
| 2006/0114993 A1 | 6/2006 | Xiong et al. | |
| 2006/0134918 A1 | 6/2006 | Fuji et al. | |
| 2006/0215919 A1 | 9/2006 | Srinivasan | |
| 2006/0233258 A1 | 10/2006 | Holcomb | |
| 2006/0252371 A1 | 11/2006 | Yanagida | |
| 2007/0058713 A1 | 3/2007 | Shen et al. | |
| 2007/0116308 A1 | 5/2007 | Zurek et al. | |
| 2007/0190940 A1 | 8/2007 | Lee et al. | |
| 2007/0291970 A1 | 12/2007 | Nikles | |
| 2008/0182517 A1 | 7/2008 | Rass | |
| 2008/0186241 A1 | 8/2008 | Christensen | |
| 2008/0261523 A1 | 10/2008 | Kubono et al. | |
| 2008/0262376 A1 | 10/2008 | Price | |
| 2008/0267436 A1 | 10/2008 | Kerselaers et al. | |
| 2009/0041241 A1 | 2/2009 | Dobyns et al. | |
| 2009/0067653 A1 | 3/2009 | Meskens et al. | |
| 2009/0202084 A1 | 8/2009 | Joeng et al. | |
| 2009/0238279 A1 | 9/2009 | Tu et al. | |
| 2009/0315787 A1 | 12/2009 | Schatzle | |
| 2009/0322540 A1 | 12/2009 | Richardson et al. | |
| 2010/0036773 A1 | 2/2010 | Bennett | |
| 2010/0136905 A1 | 6/2010 | Kristiansen | |
| 2010/0311326 A1 | 12/2010 | Klabunde et al. | |
| 2011/0029041 A1 | 2/2011 | Wiskerke | |
| 2011/0046730 A1 | 2/2011 | Meskens | |
| 2011/0137649 A1 | 6/2011 | Rasmussen | |
| 2011/0196452 A1 | 8/2011 | Forsell | |
| 2011/0248673 A1 | 10/2011 | Aerts et al. | |
| 2011/0250837 A1 | 10/2011 | Hwang et al. | |
| 2011/0255702 A1 | 10/2011 | Jensen | |
| 2011/0300801 A1 | 12/2011 | Kerselaers | |
| 2012/0032778 A1 | 2/2012 | Nakano et al. | |
| 2013/0002517 A1 | 1/2013 | Pascolini et al. | |
| 2013/0148828 A1 | 6/2013 | Fort | |
| 2013/0171933 A1 | 7/2013 | Rofougaran | |
| 2013/0278470 A1 | 10/2013 | Kataoka et al. | |
| 2013/0308805 A1 | 11/2013 | Ozden | |
| 2013/0339025 A1 | 12/2013 | Suhami | |
| 2014/0008446 A1 | 1/2014 | Carr | |
| 2014/0023216 A1 | 1/2014 | Solum et al. | |
| 2014/0049440 A1 | 2/2014 | Ueki et al. | |
| 2014/0062212 A1 | 3/2014 | Sun et al. | |
| 2014/0184462 A1 | 7/2014 | Yosui | |
| 2014/0213184 A1 | 7/2014 | Matsubara | |
| 2014/0241555 A1 | 8/2014 | Terlizzi | |
| 2014/0315486 A1 * | 10/2014 | Broyde | H04B 5/0075 455/41.1 |
| 2014/0340032 A1 | 11/2014 | Curtis | |
| 2015/0001956 A1 | 1/2015 | Saen | |
| 2015/0028690 A1 | 1/2015 | Sako | |
| 2015/0038075 A1 | 2/2015 | Kataoka | |
| 2015/0038864 A1 | 2/2015 | Kataoka et al. | |
| 2015/0061587 A1 | 3/2015 | Bruechmann | |
| 2015/0079902 A1 | 3/2015 | Dhayni | |
| 2015/0092962 A1 | 4/2015 | Amento | |
| 2015/0097442 A1 | 4/2015 | Muurinen | |
| 2015/0130465 A1 | 5/2015 | Wiggins et al. | |
| 2015/0318603 A1 | 11/2015 | Kerselaers et al. | |
| 2015/0318613 A1 | 11/2015 | Kerselaers et al. | |
| 2015/0318896 A1 | 11/2015 | Kerselaers et al. | |
| 2015/0318932 A1 | 11/2015 | Kerselaers et al. | |
| 2015/0319545 A1 | 11/2015 | Kerselaers et al. | |
| 2016/0189860 A1 | 6/2016 | Konanur et al. | |

FOREIGN PATENT DOCUMENTS

| | | |
|---|---|---|
| CN | 103024621 A1 | 4/2013 |
| WO | WO03030991 A1 | 4/2003 |
| WO | WO2013183575 | 12/2013 |

OTHER PUBLICATIONS

International Search Report and Written Opinion mailed Jul. 13, 2015 for PCT/EP2015/058044, 11 pages.

Non-Final Office Action mailed Feb. 29, 2016 for U.S. Appl. No. 14/270,013, 11 pages.

Non-Final Office Action mailed May 7, 2015 for U.S. Appl. No. 14/270,013, 12 pages.

International Search Report and Written Opinion mailed Jul. 17, 2015 for PCT/EP2015/058052, 9 pages.

Notice of Allowance mailed Jul. 21, 2015 for U.S. Appl. No. 14/302,791, 9 pages.

International Search Report and Written Opinion mailed Jul. 7, 2015 for PCT/EP2015/058071, 11 pages.

European Seach Report dated Aug. 31, 2015 for EP 15164678, 6 pages.

Final Office Action mailed Mar. 7, 2016 for U.S. Appl. No. 14/576,030, 13 pages.

Non-Final Office Action mailed Oct. 5, 2015 for U.S. Appl. No. 14/576,030, 17 pages.

European Search Report dated Aug. 31, 2015 for EP 15164622, 6 pages.

Final Office Action mailed Feb. 25, 2016 for U.S. Appl. No. 14/576,583, 13 pages.

Non-Final Office Action mailed Sep. 21, 2015 for U.S. Appl. No. 14/576,583, 17 pages.

European Search Report dated Aug. 31, 2015 for EP 15164621, 8 pages.

Non-Final Office Action mailed Oct. 5, 2015 for U.S. Appl. No. 14/569,024, 14 pages.

Final Office Action mailed Feb. 25, 2016 for U.S. Appl. No. 14/569,024, 13 pages.

(56) References Cited

OTHER PUBLICATIONS

Non-Final Office Action mailed Oct. 5, 2015 for U.S. Appl. No. 14/575,865, 17 pages.
Final Office Action mailed Mar. 4, 2016 for U.S. Appl. No. 14/575,865, 14 pages.
European Search Report dated Aug. 31, 2015 for EP 15164610, 6 pages.
U.S. Appl. No. 14/836,681, filed Aug. 26, 2015, entitled "Antenna System".
U.S. Appl. No. 15/146,665, filed May 4, 2016 entitled "Near-Field Electromagnetic Induction (NFEMI) Antenna".
Chandrasekar, K., "Inductively Coupled Connectors and Sockets for Multi-Gb/s Pulse Signaling," IEEE Transactions on Advanced Packaging, vol. 31, No. 4; Nov. 1, 2008, pp. 749-758.
Cho, N. et al., "A Planar MICS Band Antenna Combined with a Body Channel Communication Electrode for Body Sensor Network," IEEE Transactions on Microwave Theory and Techniques, vol. 57, No. 10; Oct. 2009; pp. 2515-2522.
Kado, et al., "RedTacton Near-body Electric-field Communications Technology and Its Applications," NTT Technical Review, vol. 8, No. 3, NTT Microsystems Integration Laboratories, Atsugi-shi, JP; Mar. 2010, pp. 1-6.
Ohishi, T. et al., "Novel Pair Electrode With Coils Sensing Magnetic Energy on Human Body Surface for Intrabody Communication," IEEE International Symposium on Antennas and Propagation (ISAP); Oct. 29, 2012; pp. 203-206.
Shinagawa, M. et al., "A Near-Field-Sensing Transceiver for Intra-Body Communication Based on the Electro-Optic Effect," Instrumentation and Measurement Technology Conference, Vail, CO; May 20-22, 2003; 6 pages.
Tounsi, F. et al. "Electromagnetic Modeling of an Integrated Micromachined Inductive Microphone," IEEE 4th International Conference on Design and Technology of Integrated Systems in Nanoscale Era; Apr. 6, 2009; pp. 38-43.
Zimmerman, T.G., "Personal Area Networks (PAN): Near-Field Intra-Body Communication," Massachusetts Institute of Technology, Jun. 1995, 81 pages.
Zimmerman, T.G., "Personal Area Networks: Near-Field Intrabody Communication," IBM Systems Journal; vol. 35, Nos. 3 and 4; 1996; 9 pages.
Non-Final Office Action for U.S. Appl. No. 14/576,583, Nov. 3, 2016, 33 pages.
Non-Final Office Action mailed Jan. 3, 2017 for U.S. Appl. No. 14/576,030, 39 pages.
Non Final Office Action mailed Aug. 26, 2016 for U.S. Appl. No. 14/270,013, 13 pages.
Non-Final Office Action mailed Jan. 19, 2017 for U.S. Appl. No. 14/575,865, 45 pages.
Non-Final Office Action mailed Jan. 25, 2017 for U.S. Appl. No. 14/569,024, 51 pages.
Final Office Action mailed Mar. 14, 2017 for U.S. Appl. No. 14/270,013, 37 pages.
Notice of Allowance dated Jun. 14, 2017 for U.S. Appl. No. 14/836,681, 14 pages.
Notice of Allowance dated Jun. 27, 2017 for U.S. Appl. No. 14/576,030 30 pages.
Notice of Allowance dated Jun. 21, 2017 for U.S. Appl. No. 14/576,583 34 pages.
Final Office Action dated Jul. 27, 2017 for U.S. Appl. No. 14/575,865, 56 pages.
Final Office Action dated Aug. 9, 2017 for U.S. Appl. No. 14/569,024, 52 pages.

* cited by examiner

FIG. 12

ELECTROMAGNETIC FIELD INDUCTION FOR INTER-BODY AND TRANSVERSE BODY COMMUNICATION

This application is a continuation-in-part of application Ser. No. 14/270,013, filed on May 5, 2014, which is hereby incorporated by reference for all purposes as if fully set forth herein. This application is also a continuation-in-part of application Ser. No. 14/302,791, filed on Jun. 12, 2014, which is hereby incorporated by reference for all purposes as if fully set forth herein.

TECHNICAL FIELD

Various exemplary embodiments disclosed herein relates generally to an electromagnetic induction radio.

BACKGROUND

There exist a variety of wireless systems which, illustratively, are used for short range distance communication. Some systems are used for communication around the human body; other systems may be used for communication in or around other objects. For example, currently RF based hearing aids are considered for wireless communication. Often such hearing aid systems operate in the 2.5 GHz ISM band. Such systems feature propagation by means of transverse waves, the magnetic and electric fields being in phase and covering a relatively large range of perhaps 30 meters. The large range may cause problems in terms of security of the communication content and may cause interference. Furthermore, because of their relatively high frequency of operation, such systems are heavily influenced by the human body. Somewhat more conventional hearing aids employ magnetic field induction as a wireless communication method. Unfortunately, magnetic field induction based wireless systems have a limited range if the antenna is comparatively small, such as would be required in a hearing aid. Not all parts of the human body can be reached with magnetic field induction-based systems with small antennas. Consequently, it can be difficult to provide communication between a hearing aid and a hand-held control using such systems.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to an electromagnetic induction wireless communication system including: a magnetic antenna; an electric antenna; a tuning capacitor coupled to the magnetic antenna configured to tune the magnetic antenna; a controller configured to control the operation of the communication system; a signal source coupled to the controller configured to produce a communication signal used to drive the magnetic antenna and the electric antenna; a voltage control unit coupled to the signal source configured to produce one of an amplitude difference, phase difference, and an amplitude and a phase difference between the communication signal used to drive the magnetic antenna and electric antenna.

Further, various exemplary embodiments relate to a method of communicating near a living body including: producing a communication signal; producing a modified communication signal, wherein the modified communication signal has one of an amplitude difference, phase difference, and an amplitude and phase difference from the communication signal; applying the communication signal to one of an magnetic antenna and an electric antenna; applying the modified communication signal to the other of the magnetic antenna and the electric antenna; controlling the production of the modified communication signal to improve the method of communicating near the living body Further, various exemplary embodiments relate to a non-transitory machine-readable storage medium encoded with instructions for execution by a processor, the non-transitory machine-readable medium including: instructions for producing a communication signal; instructions for producing a modified communication signal, wherein the modified communication signal has one of an amplitude difference, phase difference, and an amplitude and phase difference from the communication signal; instructions for applying the communication signal to one of a magnetic antenna and an electric antenna; instructions for applying the modified communication signal to the other of the magnetic antenna and the electric antenna; instructions for controlling the production of the modified communication signal to improve the method of communicating near the human body.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

A electromagnetic induction radio described herein improves the link budget and extends the communication range. The link budget is defined as, $$\text{Link Budget [dB]} = 20\log 10\left(\frac{V_{Rx}}{V_{Tx}}\right),$$

where VTx is the transmitter voltage on the transmitter antennas and VRx is the received voltage on the receiver antennas.

In a related U.S. patent application Ser. No. 14/270,013 entitled "ELECTROMAGNETIC INDUCTION FIELD COMMUNICATION" filed on May 5, 2014 an electromagnetic communication method near a living body by means of a combination of a magnetic field and electric field with no intention to form transversal radiating waves is described. This results in a method that improves the link budget and extends the range to the complete living body and enables communication between devices near living bodies, including a first device connected to a first body and a second device connected to a second body such that the first device communicates with the second device, wherein the first and second bodies are connected through magnetic and electric near-field coupling. Even more than two bodies or propagating are possible, but the embodiments described herein will use two living bodies for simplicity. Multiple devices with transceivers are also possible, but the embodiments described herein will use two devices or transceivers for simplicity.

The magnetic field is generated by a current through a first coil. The electric field can be generated by a first coupling capacitor, having a first conducting plate coupled to the body and a second conducting plate coupled to the environment. The wireless communication system is not galvanically connected to the ground. The magnetic and electric field can be received by a receiver at another place near the body by means of a second coil and a second coupling capacitor, the second capacitor having a first conducting plate coupled to the body and a second conducting plate coupled to the environment.

Figure 1:
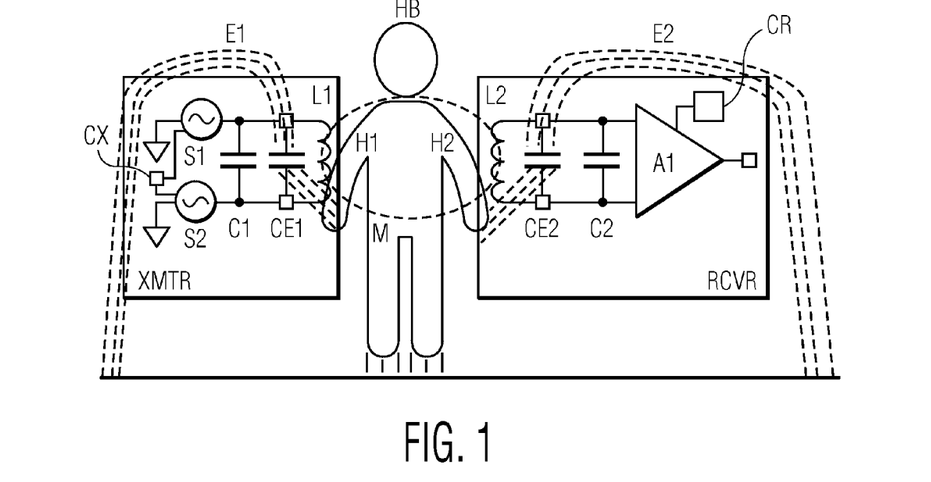
FIG. 1 illustrates a block diagram of wireless communication system.
Figure 2:
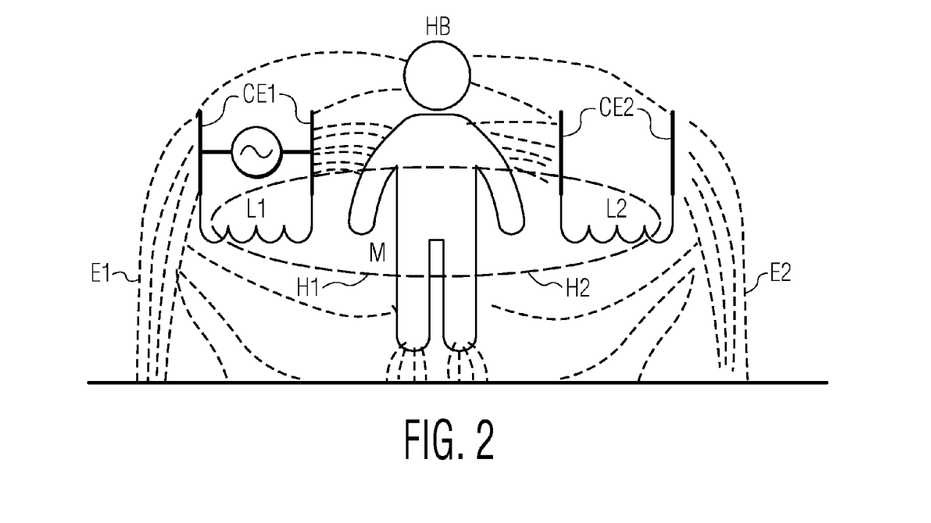
FIG. 2 illustrates a diagram of electrical and magnetic field lines during operation of the wireless communication system.

FIG. 1 illustrates a block diagram of the wireless communication system. FIG. 2 illustrates a diagram of electrical and magnetic field lines during operation of the wireless communication system. The wireless communication system of FIG. 1 includes a transmitter XMTR and receiver RCVR. Communication between transmitter XMTR and receiver RCVR is accomplished via a combination of an electric field and a magnetic field as will be further described. The transmitter XMTR and receiver RCVR are spaced apart from the human body HB by an exaggerated distance so that the electric field may be shown. The human body may be replaced by any other living body in FIG. 1, FIG. 2 and FIG. 3 Magnetic field H1 is generated by current through coil L1. An electric field E1 can be generated by a voltage on coupling capacitor CE1. Coupling capacitor CE1 has a first conducting plate coupled to the human body HB and a second conducting plate coupled to the environment as will be further illustrated below. Capacitors C1 and C2 are provided to resonate their respective circuits at the required operational frequency.

Magnetic field H1 and electric field E1 may be generated by the same voltage using sources S1 and S2. Accordingly, the sources S1 and S2 produce the communication signal to be transmitted. In this illustrative embodiment the sources S1 and S2 may generate a balanced voltage across the coil L1. However the voltage across the coil L1 may also be unbalanced and in this case only one source is required.

Magnetic field H2 and electric field E2 (which have different amplitudes than magnetic field H1 and electric field E1 respectively) may be received at a receiver RCVR positioned at another place near the human body (perhaps in the other ear) by means of a coil L2 and a coupling capacitor CE2. A signal detector A1 detects the signal received by the RCVR. Coupling capacitor CE2 has a first conducting plate coupled to the human body HB and a second conducting plate coupled to the environment as will be further illustrated in FIG. 3. Further, coils L1 and L2 may have a mutual inductance M.

FIG. 1 shows an illustrative embodiment of a transmitter XMTR and receiver RCVR that allows uni-directional communication. In another embodiment, both XMTR and RCVR may be also transceivers and bi-directional communication is thus made possible.

Not illustrated in detail are driving circuitry, signal processing circuitry, microphones, control circuitry, etc., although such items may be viewed as embodied in blocks denoted by CX or CR in FIG. 1.

This wireless communication system communicates using a wireless electromagnetic field communication method near a human body. The electromagnetic induction fields are a combination of a magnetic field H1 and electric field E1 with no intention to form transversal radiating waves. The magnetic field H1 is generated by a magnetic antenna, a coil L1, while the electric field E1 is generated by a voltage on a coupling capacitor CE1. This coupling capacitor CE1 has a first conducting plate P11 coupled to the human body HB and a second conducting plate P12 coupled to the environment. The wireless system, including the transmitter XMTR and receiver RCVR, is not galvanically connected to the ground. It will be noted that the electric field lines E1 and E2 extend down the length of the human body HB.

A combination of a magnetic field and an electric field is created, and the electric field is present between the living body and the environment. The magnetic induction field decreases with 60 db per decade distance from the source in air, however the electric induction field decreases with less than 60 db per decade of the distance from the source.

The magnetic field H2 and electric field E2 can be received by a receiver at another place near the human body by means of a coil L2 and a coupling capacitor CE2, the coupling capacitor CE2 having a first conducting plate P21 coupled to the human body and a second conducting plate P22 to the environment.

In the embodiments discussed, the coils and coupling capacitors are so small that (i.e. less than about 5% of the wavelength of the electric E1 and E2 and magnetic H1 and H2 fields, that there is not significant generation of undesired transverse radiating waves.

Figure 3:
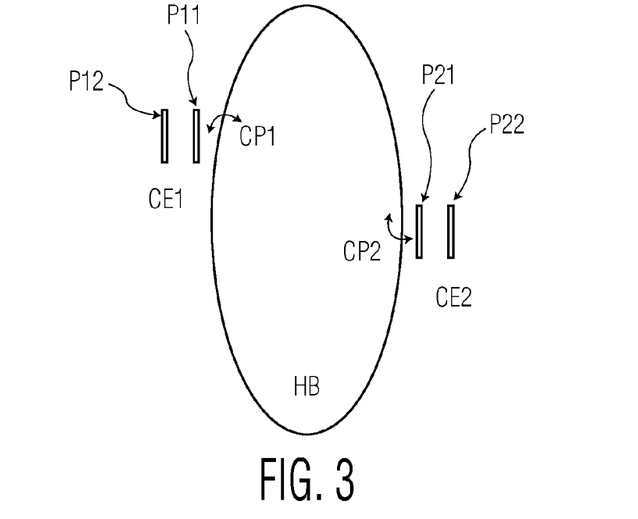
FIG. 3 illustrates the coupling capacitors CE1 and CE2 near a human body.

In an embodiment, coils L1 and L2 are unscreened and smaller (ideally much smaller) than the chosen wavelength of operation. The capacitors CE1 and CE2 each have one conducting surface, i.e., P11 and P22 in FIG. 3, which is close to or in contact with a body, illustratively, a human body HB. The opposing surfaces, i.e., plates P12 and P22 of FIG. 3 are closer to the environment than the human body HB, and the size of the plates are smaller (ideally much smaller) than the chosen wavelength of operation. Plates P12 and P11 are preferably parallel and have the same shape, but it is also permissible that the plates are of different size and only partially parallel (i.e. somewhat non-parallel) or side by side. The same is true for plates P21 and P22.

FIG. 3 illustrates the coupling capacitors CE1 and CE2 near a human body HB. The conductive plate P11 of coupling capacitor CE1 is coupled with the human body HB. The conductive plate P12 of coupling capacitor CE1 is coupled to the environment. The conductive plate P21 of coupling capacitor CE2 is coupled with the human body HB at another position. The conductive plate P22 of coupling capacitor CE2 is coupled to the environment. CE1 has a coupling factor CP1, and CE2 has a coupling factor CP2. The coupling factor CP1 and CP2 play a role in the link budget of the communication system.

Plates P11, P12, P21, and P22 may be made from conductive material, for example metal. In general, plates P11, P12, P21, and P22 may have a variety of shapes and may be surrounded by dielectric material so that the overall structure of CE1 and CE2 performs a capacitive function. In general, the dimensions of capacitors CE1 and CE2 should be small relative to the wavelength of operation.

However different applications may require a composition of electric and magnetic fields of different amplitudes and phase between them. Therefore a system is described below that may be integrated in a RF integrated circuit and that is suitable to generate a blending of field amplitudes and phase that may be programmed to be specifically suited for various applications. The blending can be continuously adaptable. In order to understand the effects of different amplitudes and phases between the electric and magnetic fields various tests and measurements were done. The results of these tests are discussed below and provide insight as to the benefits of varying the amplitudes and phases between the electric and magnetic fields.

By way of an example embodiment, if capacitors CE1 and CE2 are approximately 10 pF in value (which is somewhat defined by coupling capacitor design), while coils L1 and L2 are be approximately 3.7 µH, then some extra capacitance may be required to tune the circuit to the desired operational frequency, for example 10.6 MHz. Consequently the values of capacitors C1 and C2 are approximately 50.96 pF. In an embodiment, capacitors C1 and C2 are a capacitor bank which may be integrated into an RF integrated circuit that is adjustable to resonate at the required frequency. The adjustability compensates for the added capacitance due to the human body.

From measurements it was found that the link budget for the electromagnetic induction system can be changed. Different link budget values can be obtained by means of varying the phase and amplitude of the magnetic and the electric field that is generated by the wireless communication system. Thus a system that varies the amplitude and phase of the voltage applied to the coil antenna and the capacitor antenna may be used to improve the performance of the wireless communication system.

Figure 4:
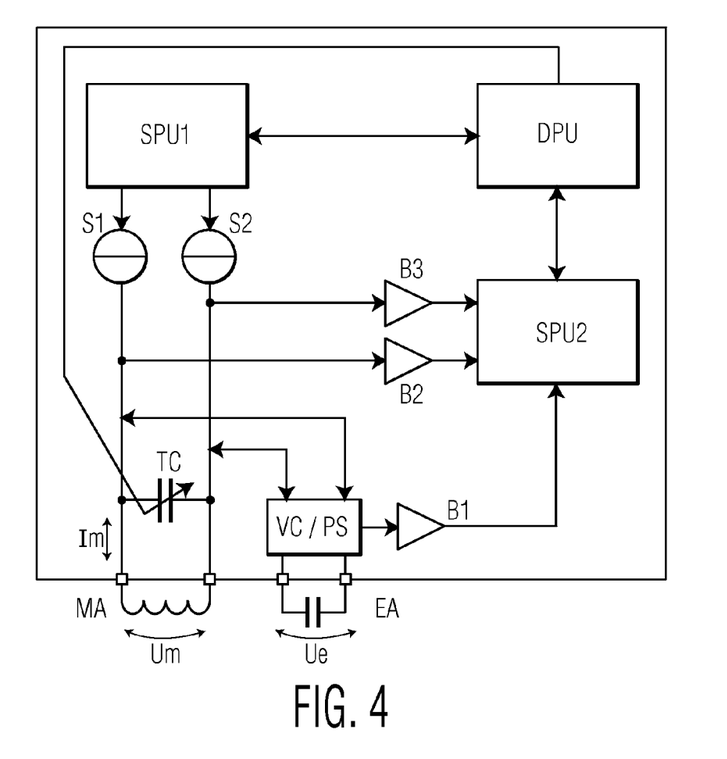
FIG. 4 illustrates block diagram of an embodiment of an electromagnetic induction radio.

FIG. 4 illustrates block diagram of an embodiment of an electromagnetic induction radio. The electromagnetic induction radio (EIR) may include a digital processing unit DPU, signal processing units SPU1 and SPU2, signal generators S1 and S2, buffers B1, B2, and B3, a tuning capacitor TC, a voltage processing unit VC/PS, an magnetic antenna coil MA, and an electric antenna capacitor EA.

The digital processing unit DPU may control the operation of the EIR and processes the signals related to the communication. The digital processing unit may contain analog digital converters (ADC) and/or digital analog convertors (DAC), memory, storage, and all the hardware and software required to process the communication signals. The digital processing unit may include a processor that may be any hardware device capable of executing instructions stored in a memory or other storage or otherwise processing data. As such, the processor may include a microprocessor, field programmable gate array (FPGA), application-specific integrated circuit (ASIC), or other similar devices. The memory may include various memories such as cache or system memory. As such, the memory may include static random access memory (SRAM), dynamic RAM (DRAM), flash memory, read only memory (ROM), or other similar memory devices. The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. For example, the storage may store a base operating system for controlling various basic operations of the hardware. It may also store data received and processed by the EIR. Also, the storage my include instructions used to process the data received by the EIR.

Signal processing units SPU1 and SPU2 may contain the required hardware to interface to the antenna circuitry MA and EA and the digital processing unit DPU. SPU1 and SPU2 may include a processor that may be any hardware device capable of executing instructions stored in a memory or other storage or otherwise processing data. As such, the processor may include a microprocessor, a signal processor, graphics processor, field programmable gate array (FPGA), application-specific integrated circuit (ASIC), or other similar devices. The signal processing unit SPU1 may help implement the transmitter function while the signal processing unit SPU2 may help implement the receiver function. In such a case the EIR may have a transceiver functionality and thus may be able to perform bidirectional communication.

In a transmitter mode, the magnetic field Um is generated by a first alternating current $I_m$ through a magnetic antenna, coil MA, while the electric field Ue is generated by a second alternating voltage $V_e$ on the electric antenna capacitor EA. The current $I_m$ through the coil MA is dependent on the voltage on the coil:

$$I_m = V_m/Z_{coil},$$

$$Z_{coil} = 2\pi f L_{coil}$$

The two voltages $V_m$ and $V_e$ thus define the magnetic and electric fields Um and Ue respectively. Changing one of the amplitudes of $V_m$ and $V_e$ or the phase between them, changes the combination of the magnetic field Um and electric field Ue and thus blending of the fields may be done in order to improve the performance of the wireless communication system.

Signal processing unit SPU1 may command signal generators S1 and S2 to produce currents that drive the resonating circuit formed by coil MA and tuning capacitor TC. Accordingly, the sources S1 and S2 produce the communication signal to be transmitted. In this illustrative embodiment the sources S1 and S2 may generate a balanced voltage across MA. However the voltage across MA may also be unbalanced and in this case only one source is required. TC is an integrated capacitor bank that may be adjusted by the digital processing unit DPU to tune the receiver/transmitter. The resonating frequency can be chosen in one of the industrial, scientific, and medical (ISM) bands, for example 10.6 MHz. The resonating circuit may have a bandwidth that is sufficient for the required communication mode data rate. Optionally the bandwidth may be adapted by means of inserting additional loss in the resonating circuit using, for example, a resistor bank which may have an adjustable resistance. This may be an additional functional block in the EIR.

The voltage $V_m$ on the magnetic antenna MA is processed in the voltage processing unit VC/PS and further applied to the electric antenna EA. The VC/PS produces a voltage $V_e$ that is applied to the electric antenna EA. The VC/PS may reduce or increase the input voltage $V_e$ relative to $V_m$. The VC/PS may additionally also change the phase between $V_m$ and $V_e$. In this way the composition of magnetic and electric fields may be changed according to the needs of the application. Alternatively the voltage Ve that is applied to the electric antenna EA is processed in the voltage processing unit VC/PS and further applied to the magnetic antenna MA. The VC/PS produces a voltage Vm that is applied to the magnetic antenna MA. The VC/PS may reduce or increase the input voltage $V_m$ relative to $V_e$. The VC/PS may additionally also change the phase between $V_e$ and $V_m$. In this way the composition of magnetic and electric fields may be changed according to the needs of the application.

In the receive mode the voltage received by the magnetic antenna MA may be combined with the voltage received by the electric antenna EA. Before combining both signals the phase and/or amplitude between them may be adapted.

For example, when both signals are combined in a parallel tuned circuit, the amplitude of the induced antenna voltages should have a 180 degree phase shift between them to generate an optimal combined output signal. This may not always be desirable for all applications due to antenna design and positioning at the human body. Moreover the phase between them may change dynamically and the VC/PS may continuously respond to such changes.

The signal processing unit SPU2 may process the received voltages from the antennas MA and EA. It is noted that the VC/PS may have bidirectional functionality. The signal at the resonating circuit formed by TC and MA may be buffered by buffers B2 and B3. An additional buffer B1 may be available to monitor the difference between received magnetic and electric field strength. Alternatively, the receiver and transmitter can also have separate receive and transmit VC/PS.

The DPU may adjust the amplitude and phase characteristics between the electric and magnetic fields used to implement communication between a transmitter and a receiver. Information regarding the communication environment may be based upon various collected test data. Also, test measurements may be made for each individual user of the communication system. Further, various channel measurement signals may be included as part of the communication signal in order to determine variations in the communication channel during the operation of the wireless communication system. These channel measurements may then be used to adjust the phase and amplitude between the magnetic and electric fields. Further, feedback loops may be used to further monitor and adjust the phase and amplitude of between the magnetic and electric signals.

The EIR may be implemented as a combination of different integrated circuits (ICs) or on a single IC. Further, the DPU, SPU1, and SPU2 are shown as separate physical and functional blocks in FIG. 4, but the DPU, SPU1, and the SPU2 may be implemented in a single processor which may be its own IC. Also, SPU1 and SPU2 may be implemented on a single signal processing unit which may be its own IC. The DPU or the combination of the DPU, SPU1, and SPU2 may be called a controller that controls the operation of the EIR.

Figure 5:
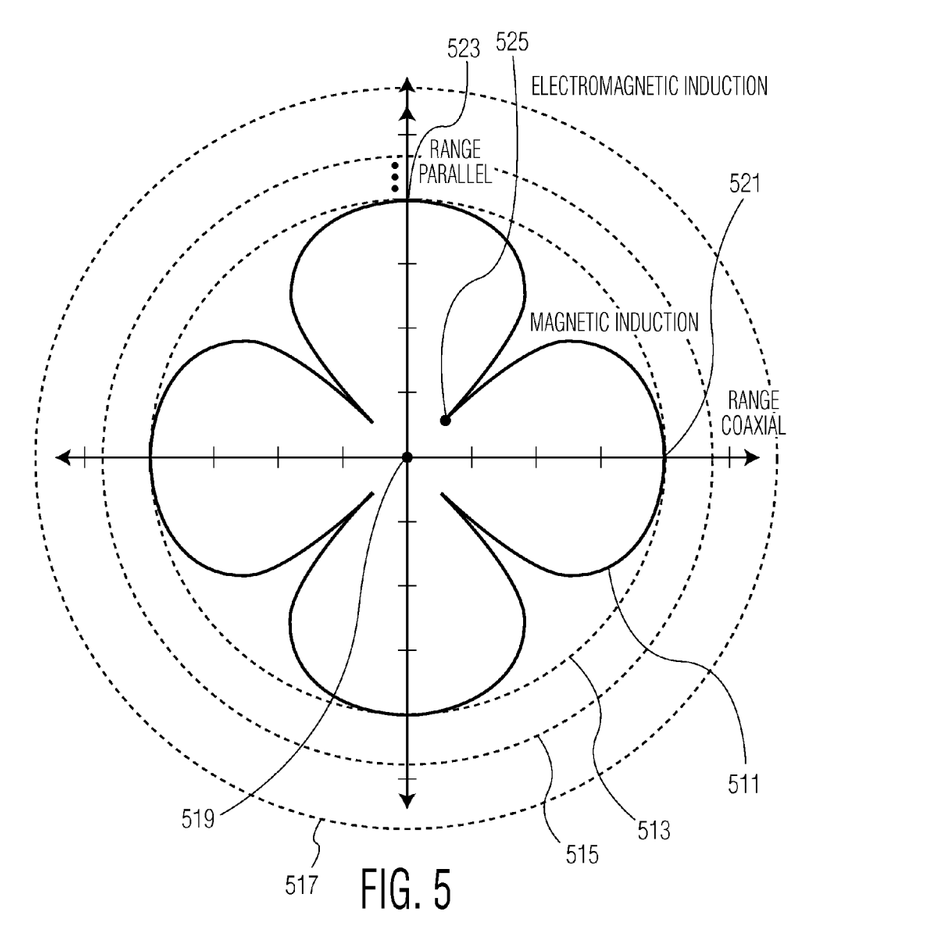
FIG. 5 is a diagram illustrating comparative ranges of a communication system which uses magnetic field induction and a communication system using electromagnetic field induction.

FIG. 5 is a diagram illustrating comparative ranges of a communication system which uses magnetic field induction and a communication system. In FIG. 5, the horizontal axis indicates directivity when coils L1 and L2 are coaxial; the vertical axis indicates directivity when coils L1 and L2 are parallel. The directivity in case of a link using the magnetic field induction method is illustrated by line 511. It will be noted that the range drops significantly when moving from the case where both coils are coaxial to the case where coils are parallel. Using the diagram of FIG. 5, if the transmit coil L1 of FIG. 1 were located at the origin 519 of FIG. 5, one can see that the receiver coil L2 can be placed in either location 521 or 523 (which correspond, respectively, to a coaxial orientation with respect to the transmitter coil L1 or a parallel orientation with respect to transmitter coil L1) and best-case detection of the magnetic field generated by transmit coil L1 will be achieved. However, if the receiver coil L2 is positioned along a line which is oriented at forty five degrees between locations 521 and 523, (i.e. at location 525), the receiver coil must be placed substantially closer to the transmitter coil L1 for adequate detection to occur. The disclosed embodiment, however exhibits a more omnidirectional range profile and possibly greater range. The omnidirectional profile and possibly greater range in case of a link using electromagnetic induction fields facilitate more robust communication.

Figure 6:
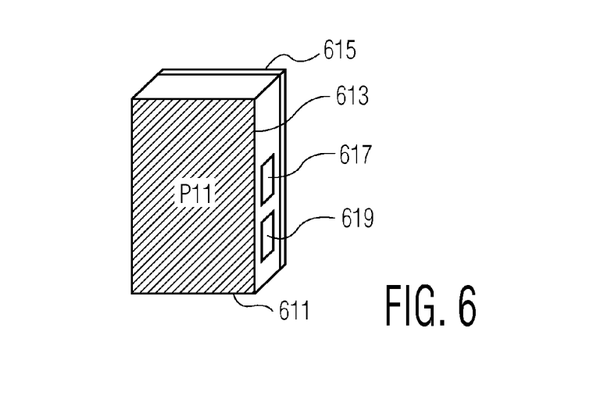
FIG. 6 depicts a control and/or display unit.

In another embodiment, there may be a separate control and/or display unit. FIG. 6 depicts a control and/or display unit 611. Control and/or display unit 611 has two plates 613 and 615 on opposite sides. Control and/or display unit 611 may be held in the hand of a user. One of the plates, 613 or 615 will be held more securely in the hand than the other and will therefore be more strongly coupled to the user's body, while the other plate will have a somewhat stronger coupling to the environment. Control and/or display unit 611 is capable of communicating with transmitter XMTR or receiver RCVR. Illustratively, control and/or display unit may, in combination, or individually, provide: volume control; noise reduction control; human body parameters such as heart rate, and other items such as physical parameters monitored around the body. Operation of the control and/or display unit is facilitated by the electromagnetic induction fields. In an embodiment, dimensioning and parallelism are similar to that described for plates P12 and P22 above. Control and/or display unit may have a display, and internal circuitry, 619, similar to either transmitter XMTR or receiver RCVR (or may have internal circuitry which is a transceiver as previously described).

Next embodiments related to inter-body (between bodies) and between-inside-and-outside-of-body wireless communication devices that are using frequency bands from 0.1 MHz to 100 MHz will be described.

The method of inter-body communication is useful for products for secure communications/transactions, where for example the identity of one human body is verified by skin contact to a second human body using an mainly electric field where after secure data transmission can occur using a mainly magnetic field. For example two people may be wearing devices that can communicate to one another to exchange information when the two people shake hands. However communication is possible between devices near bodies comprising a first device connected to a first body and a second device connected to a second body such that the first device communicates with the second device, wherein the first and second bodies are connected through magnetic and electric near-field coupling.

Even more than two bodies or devices are possible, but the embodiments described herein will use two living bodies for simplicity. Multiple transceivers are also possible, but the embodiments described herein will use two transceivers for simplicity.

The method for between-inside-and-outside-of-body communication provides communication from inside the body to outside the body and vice versa and is useful for products that are implanted in a living body and need to communicate with another node located outside of the living body close to the body's surface. An application can be (re)programming of the implanted electronics with communication through tissue. Another application may include communication from an implanted device for heart attack prediction to a wearable monitoring device.

These methods take advantage of the above described electromagnetic communication methods, where an electromagnetic communication method uses the combination of a magnetic field and electric field with no intention to form transversal radiating waves. These electromagnetic communication methods will improve the link budget and make the wireless connection more robust for both inter-body communication and between-inside-and-outside-of-body communication.

Figure 7:
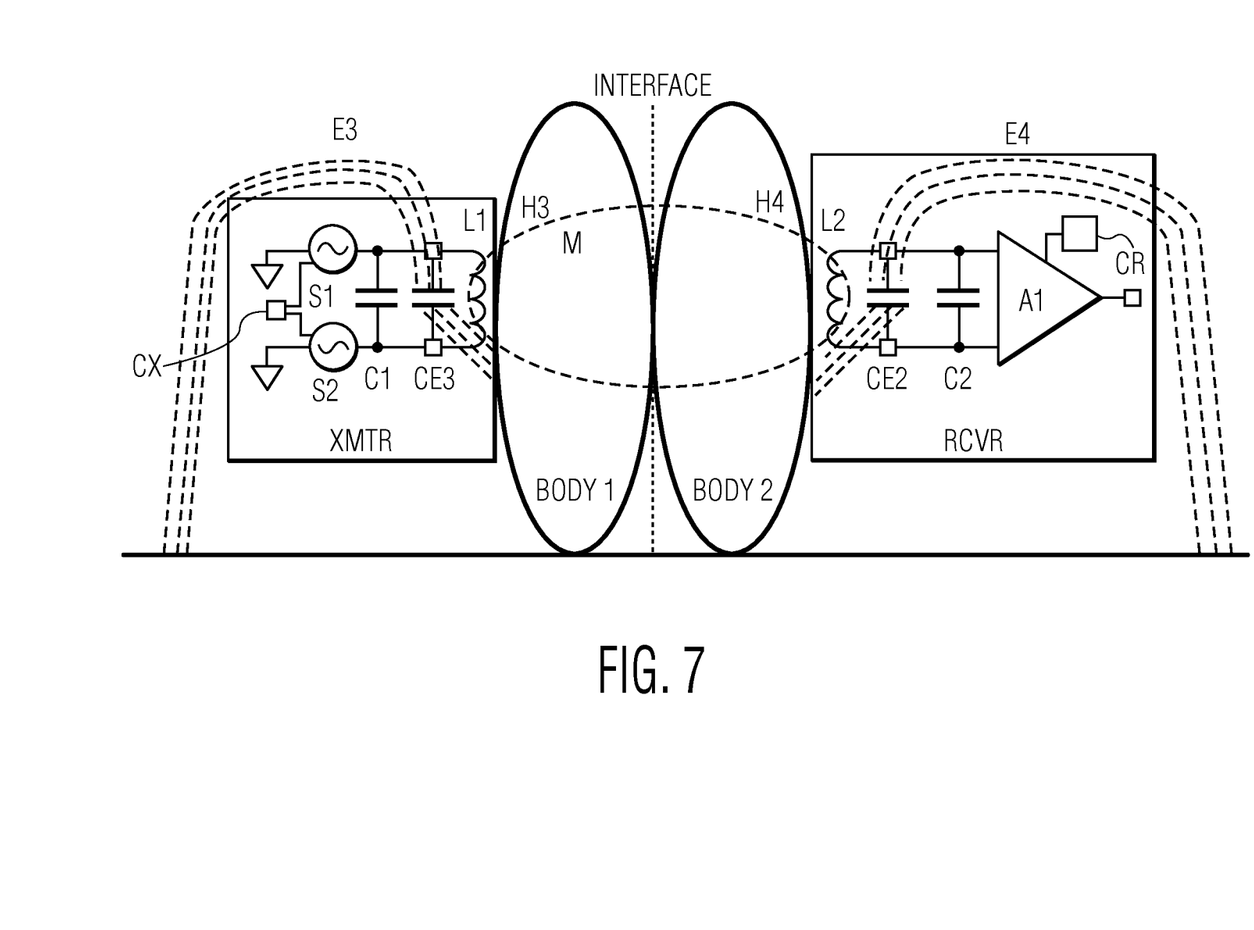
FIG. 7 illustrates a block diagram of the wireless communication system using two bodies.
Figure 8:
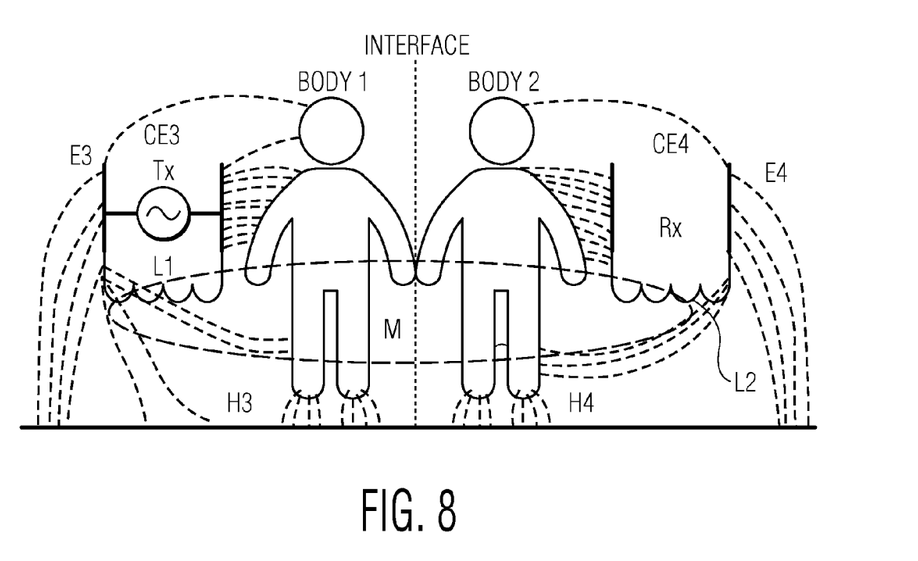
FIG. 8 illustrates a diagram of electrical and magnetic field lines during operation of the wireless communication system using two bodies.

FIG. 7 illustrates a block diagram of the wireless communication system using two bodies. FIG. 8 illustrates a diagram of electrical and magnetic field lines during operation of the wireless communication system using two bodies. The wireless communication system of FIG. 7 is similar to that of FIG. 1. Similar labels will be used to those of FIG. 1. The wireless communication system of FIG. 7 includes a transmitter XMTR and receiver RCVR. Communication between transmitter XMTR and receiver RCVR is accomplished via a combination of an electric field and a magnetic field as will be further described. The transmitter XMTR may be in contact with or close to a first human body Body 1. The receiver RCVR may be in contact with or close to a second human body Body 2. The transmitter XMTR and receiver RCVR are spaced apart from the human bodies Body 1 and Body 2 by an exaggerated distance so that the electric field may be shown. Magnetic field H3 is generated by current through coil L1. An electric field E3 may be generated by a voltage on coupling capacitor CE3. Coupling capacitor CE3 has a first conducting plate coupled to the first human body Body 1 and a second conducting plate coupled to the environment as will be further illustrated below. Capacitors C1 and C2 are provided to resonate their respective circuits at the required operational frequency.

As shown in FIG. 8, magnetic field H3 and electric field E3 may be generated by the same voltage using sources S1 and S2. Accordingly, the sources S1 and S2 produce the communication signal to be transmitted. In this illustrative embodiment the sources S1 and S2 may generate a balanced voltage across the coil L1. However the voltage across the coil L1 may also be unbalanced and in this case only one source is required.

Magnetic field H4 and electric field E4 (which have a different amplitudes than magnetic field H3 and electric field E3 respectively) may be received at a receiver RCVR positioned at another place near the second human body Body 2 by means of a coil L2 and a coupling capacitor CE4. Coupling capacitor CE4 has a first conducting plate coupled to the second human body Body 2 and a second conducting plate coupled to the environment as will be further illustrated in FIG. 9. Further, coils L1 and L2 have a mutual inductance M.

FIG. 7 shows an illustrative embodiment of a transmitter XMTR and receiver RCVR that allows uni-directional communication. In another embodiment, both XMTR and RCVR may be also transceivers and bi-directional communication is thus made possible.

Not illustrated in detail are driving circuitry, signal processing circuitry, microphones, control circuitry, etc., although such items may be viewed as embodied in blocks denoted by CX or CR in FIG. 7.

This wireless communication system communicates using an electromagnetic field communication method near a human body. The electromagnetic induction fields are a combination of a magnetic field H3 and electric field E3 with no intention to form transversal radiating waves. The magnetic field H3 is generated by a magnetic antenna, a coil L1, while the electric field E3 is generated by a voltage on a coupling capacitor CE3. This coupling capacitor CE3 has a first conducting plate P33 coupled to the first human body Body 1 and a second conducting plate P34 coupled to the environment. The wireless system, including the transmitter XMTR and receiver RCVR, is not galvanically connected to the ground. It will be noted that some of the electric field lines E3 and E4 extend down the length of the human bodies Body 1 and Body 2.

A combination of a magnetic field and an electric field is created, and the electric field is present between the human bodies and the environment. The magnetic induction field decreases with 60 db per decade of the distance from the source in air, however the electric induction field decreases less than 60 db per decade of the distance.

The magnetic field H4 and electric field E4 may be received by a receiver RCVR at another place near the second human body by means of a coil L2 and a coupling capacitor CE4, the coupling capacitor CE4 having a first conducting plate P43 coupled to the human body and a second conducting plate P44 to the environment.

Figure 9:
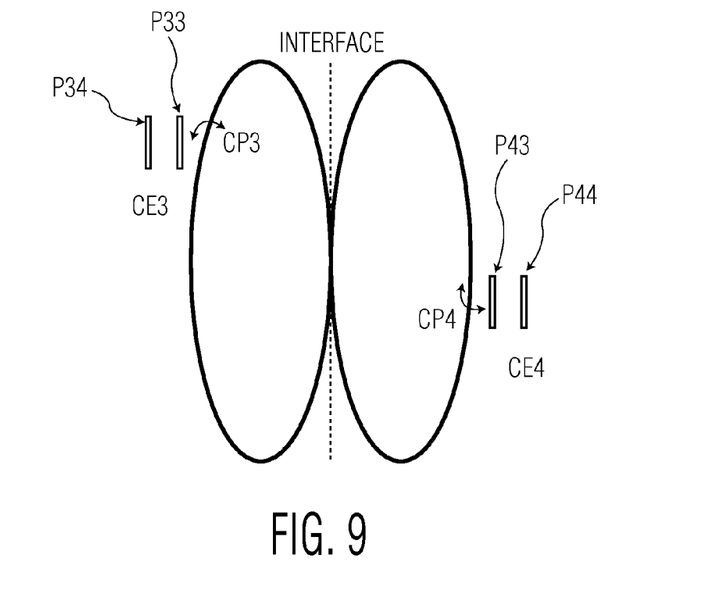
FIG. 9 illustrates the coupling capacitors CE3 and CE4 near a human bodies Body 1 and Body 2.

FIG. 9 illustrates the coupling capacitors CE3 and CE4 near human bodies Body 1 and Body 2. The conductive plate P33 of coupling capacitor CE3 is coupled with the first human body Body 1. The conductive plate P34 of coupling capacitor CE3 is coupled to the environment. The conductive plate P43 of coupling capacitor CE4 is coupled with the second human body Body 2. The conductive plate P44 of coupling capacitor CE4 is coupled to the environment. CE3 has a coupling factor CP3, and CE4 has a coupling factor CP4. The coupling factor CP3 and CP4 play a role in the link budget of the communication system.

Plates P33, P34, P43, and P44 may be made from conductive material, for example metal. In general, plates P33, P34, P43, and P44 may have a variety of shapes and may be surrounded by dielectric material so that the overall structure of CE3 and CE4 performs a capacitive function. In general, the dimensions of capacitors CE3 and CE4 should be small relative to the wavelength of operation.

Four test cases were developed and performed. The four test cases were used for the link budget measurements of inter-body communication. The first test case includes two human bodies wearing wrist devices. The first human body on the left wears the transmit device on the right wrist, and the second human body on the right wears the receiver device on the left wrist. The on-body distance is the largest in this test case.

The second test case shows two human bodies wearing wrist devices. The first human body on the left wears the transmit device on the left wrist, and the second human body on the right wears the receiver device on the right wrist. The on-body distance is the shortest in this test case.

The third test case includes two human bodies, one wearing a wrist device and another wearing the device on the upper arm. The first human body on the left wears the receiver device on the left wrist, and second human body on the right wears the transmit device on the upper arm. The on-body distance for the third case is about the average of all of the test cases.

The fourth test case shows two human bodies, one wearing a wrist device and another wearing the device at a hearing aid location. The first human body on the left wears the receiver device on the left wrist, and the second human body on the right wears the transmit device at the right ear. The on-body distance for the fourth case is about average of all the test cases.

Figure 10:
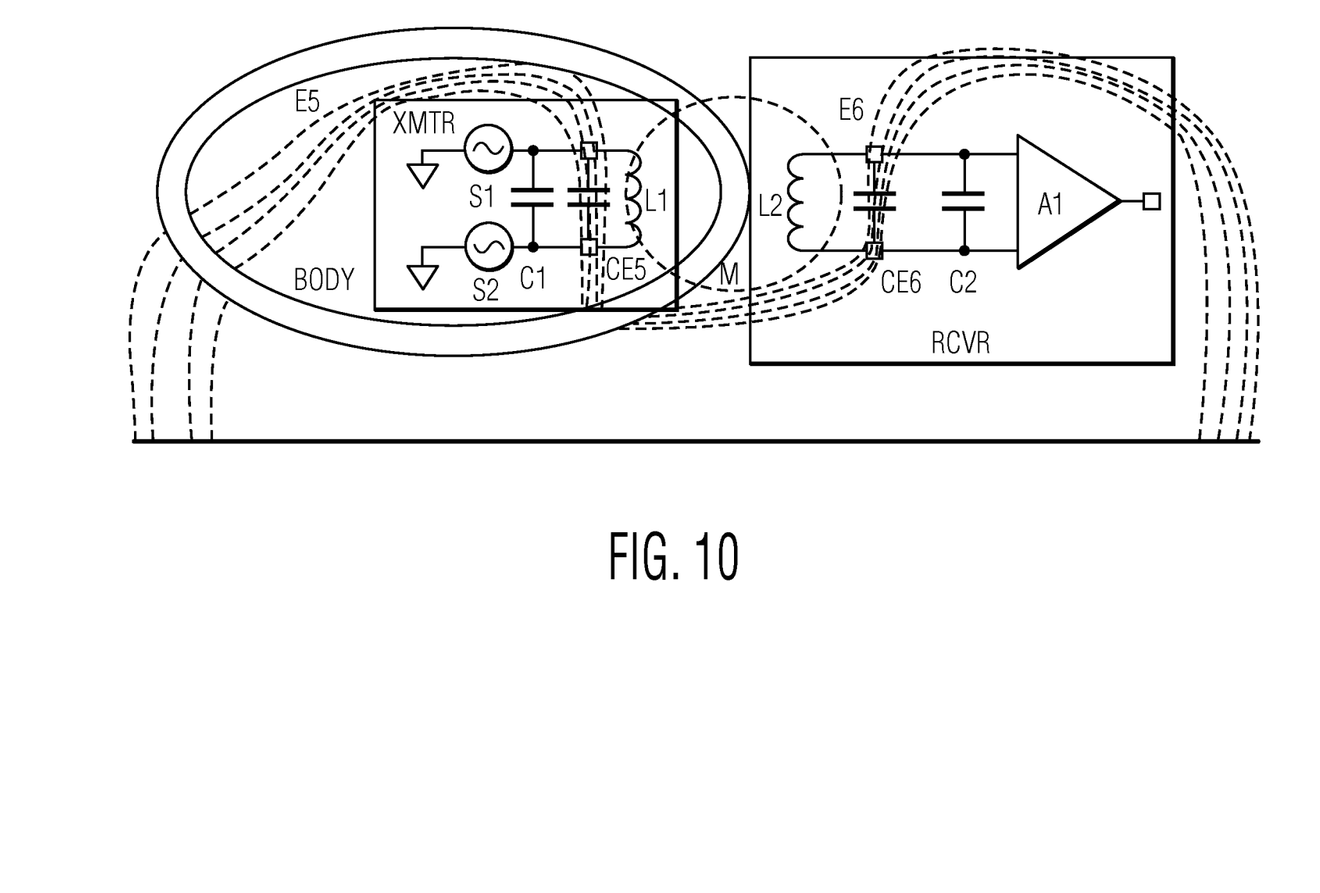
FIG. 10 illustrates a block diagram of the wireless communication system for use in between-inside-and-outside-of-body communication.

Table 1 below displays link budget measurements at 10.6 MHz of a prior art magnetic induction method (MI) and the electromagnetic induction method (EMI) according an embodiment in the intra-body communication mode. In all test cases one coupling plate of both coupling capacitors was isolated from the human body by means of clothes with a thickness of 2 to 3 mm. The transmitter and receiver antennas are a combination of a ferrite coil and a coupling capacitor. The ferrite coil having 2 mm diameter and 7 mm length with an inductance of 3.7 uHenry; the coupling capacitor having dimensions of 2 by 3 cm surface area and 4 mm distance between the conducting plates, the area between them is air with a capacitance of 12 pFarad. The RX voltage is measured across the receiving antennas that are connected in parallel with each other as shown in FIG. 10. The noise floor of our measuring set-up has been found 24 uV.

TABLE 1

| Inter-body communication: 2 human bodies test case and constraints | | Rx Voltage [uV] | Link budget [dB] |
|---|---|---|---|
| 1 | arm 2 arm communication between user 1 and user 2 2 wrist devices (long on-body distance) | | |
| | MI | Below noise floor | — |
| | EMI | 26 | −99 |
| 2 | 2 wrist devices (short on-body distance), coils are coaxial | | |
| | MI | 2027 | −61 |
| | EMI | 7112 | −51 |
| 3 | user 1: wrist device and user 2: upper arm patch device | | |
| | MI | Below noise floor | — |
| | EMI | 88 | −89 |
| 4 | user 1: wrist device and user 2: hearing aid | | |
| | MI | Below noise floor | — |
| | EMI | 51 | −93 |

From table 1 it can be seen that the received voltage is higher when the EMI method is used for inter-body communication compared to the magnetic field induction method in all test cases and thus a more robust communication is provided.

The test cases 1, 3 and 4 show a received voltage readout that is below the noise floor for the magnetic field induction communication method. In all cases the EMI produced measurements that allowed for communication across two bodies.

FIG. 10 illustrates a block diagram of the wireless communication system for use in between-inside-and-outside-of-body communication. Here the transmitter XMTR is shown inside the body, and the RCVR is shown outside the body. The transmitter XMTR and receiver RCVR may operate like the transmitters and receivers described above. The RCVR may include signal detector A1 detects the signal received by the RCVR as described above. Again non-radiating magnetic and electric fields are used to allow for communication between the transmitter XMTR and the receiver RCVR. The coupling capacitors CE5 and CE6 produce and detect the electric fields E5 and E6 similar to the descriptions above. Also, a magnetic field produced by the coil L1 may be detected by the coil L2 similar to the descriptions above. Also, as described above the transmitter XMTR and receiver RCVR may also be transceivers that both transmit and receive signals.

Figure 11:
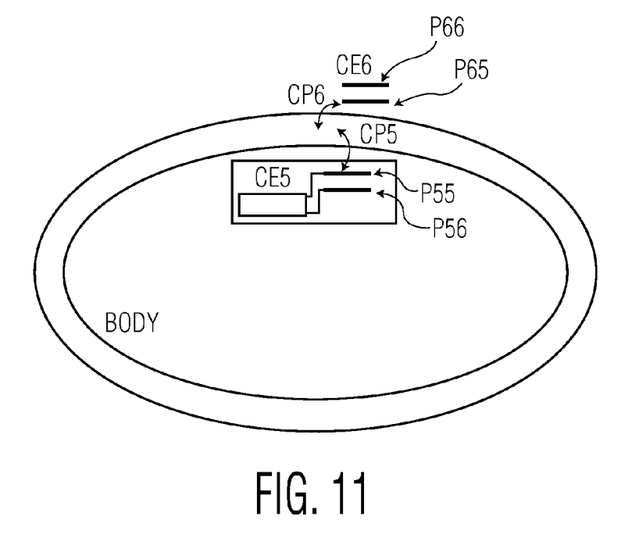
FIG. 11 displays the coupling capacitors CE5 and CE6 in case of between-inside-and-outside-of-body communication.

FIG. 11 displays the coupling capacitors CE5 and CE6 in case of between-inside-and-outside-of-body communication. The conductive plate P55 of coupling capacitor CE5 is coupled with the inside of the body. The conductive plate P56 of coupling capacitor CE5 is coupled to electronic unit inside the body. The conductive plate P65 of coupling capacitor CE6 is coupled with the outside of the body. The conductive plate P66 of coupling capacitor CE6 is coupled to the environment. As before, the coupling factors CP5 and CP6 play a role in the link budget of the communication system.

Figure 12:
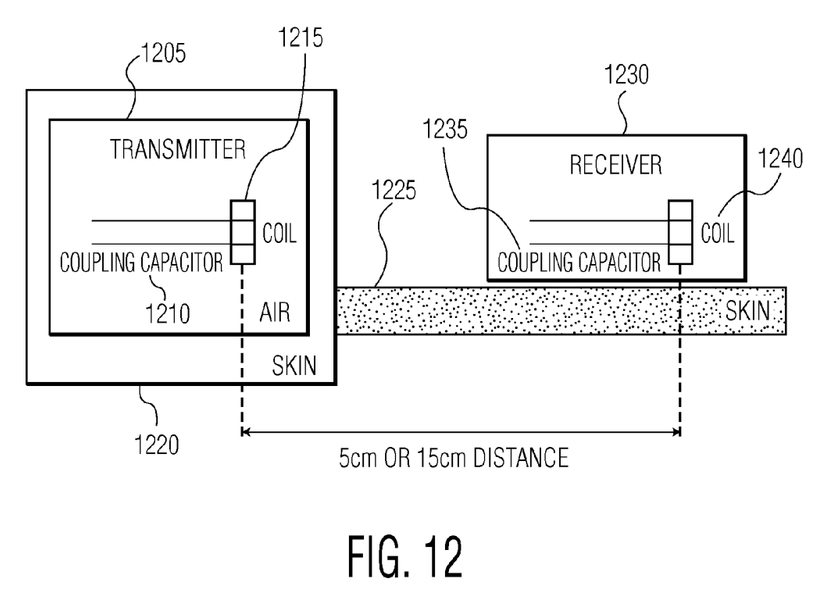
FIG. 12 displays the between-inside-and-outside-of body communication simulation setup used to transmit to an outside receiver or to transmit to an inside receiver in case of the electromagnetic induction method according the embodiment described in FIG. 14.

FIG. 12 displays the between-inside-and-outside-of body communication simulation setup used to transmit to an outside receiver or to transmit to an inside receiver in case of the electromagnetic induction method according the embodiment described in FIG. 11. When simulating the prior art magnetic induction method the plate capacitors at the receiver and transmitter are removed. The test set up included a transmitter 1205 that included a coupling capacitor 1210 and a coil 1215. The transmitter 1205 was enclosed in a body structure 1220 made of a biological material and a material modeling skin. Further attached to the body structure 1220 is a skin extension 1225 also made of a biological material and a material modeling skin. A receiver 1230 is then attached to the skin extension 1225. The receiver 1220 includes a coupling capacitor 1235 and coil 1240.

As shown the transmitting (or receiving) device is placed in the interior of body structure 1220. The receiver (or transmitter) is then moved horizontally over the surface of the skin extension 1225 resulting in a 5 cm and a 15 cm communication link distance. A 3-D electromagnetic simulation of the link budget at 10.6 MHz was performed comparing the prior art magnetic induction method and the electromagnetic induction method according the embodiment with the between-inside-and-outside-of-body communication mode. The following four scenarios were simulated: 1) parallel coils with a 5 cm link distance with Tx inside and Rx outside; 2) parallel coils with a 15 cm link distance with Tx inside and Rx outside; 3) parallel coils with a 5 cm link distance with Tx outside and Rx inside; 4) parallel coils with a 15 cm link distance with Tx outside and Rx inside. The link budget of the magnetic induction method was chosen as the reference value and the difference in link budget was then compared to the electromagnetic induction method of the described embodiments. In each of the test cases, the EMI embodiment showed a 4 dB increase in link budget versus the MI embodiment. In addition, by using the invention in between-inside-and-outside-of-body communication method the directivity limitation of a magnetic induction link is removed.

Although various embodiments described relate to a method of communicating near a living body, propagating objects other than a living body may be used in the described embodiments. The first and a second device may be connected through magnetic and electric near-field coupling using the propagating objects to help propagate the fields.

It should be appreciated by those skilled in the art that any block diagrams herein represent conceptual views of illustrative circuitry embodying the principles of the invention. Further, in the circuits shown additional elements may also be included as needed, or variations to the structure of the circuit may be made to achieve the same functional results as the circuits illustrated.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. An electromagnetic induction wireless transceiver comprising:
    a magnetic antenna comprising a coil;
    an electric antenna comprising a capacitor including first and second plates, the coil connected in parallel with the capacitor, the first plate positioned adjacent to and coupled to a first living body; and
    a signal source configured to produce a generated communication signal used to drive the magnetic antenna to produce a generated near-field magnetic field and to drive the electric antenna to produce a generated near-field electric field,
    wherein the transceiver, when positioned adjacent to and coupled to the first living body, is configured to communicate with another electromagnetic induction wireless transceiver positioned adjacent to and coupled to a second living body,
    wherein the first and second living bodies are connected through skin contact,
    wherein the generated near-field electric field is coupled to the first and second living bodies, and
    wherein the generated near-field magnetic field passes through the first and second living bodies.

2. The transceiver of claim 1, further comprising a tuning capacitor coupled to an antenna combination configured to tune the antenna combination, wherein the antenna combination includes the magnetic antenna and the electric antenna.

3. The transceiver of claim 1, wherein there is no galvanic connection between the transceiver and ground.

4. The transceiver of claim 1, further comprising a voltage control unit coupled to the signal source configured to produce one of an amplitude difference, phase difference, and an amplitude and a phase difference between the communication signals used to drive the magnetic antenna and electric antenna.

5. The transceiver of claim 4, further comprising a controller including a data processing unit and signal processing unit, wherein the controller controls the operation of the voltage control unit.

6. The electromagnetic induction wireless transceiver of claim 1, further comprising:
    a signal detector configured to detect a received communication signal carried via a received near-field magnetic field detected on the magnetic antenna and a received near-field electric field detected on the electric antenna,
    wherein the received near-field electric field is coupled to the first and second living bodies, and
    wherein the received near-field magnetic field passes through the first and second living bodies.

7. The electromagnetic induction wireless communication system of claim 1, wherein the generated near-field magnetic field and the generated near-field electric field are generated by a same voltage signal.

8. The electromagnetic induction wireless transceiver of claim 1, wherein the transceiver is implemented in a hearing aid device.

9. The electromagnetic induction wireless transceiver of claim 1, wherein the transceiver is implemented in a wrist device.

10. An electromagnetic induction wireless communication system comprising a transmitter, the transmitter comprising:
    a magnetic antenna comprising a coil;
    an electric antenna comprising a capacitor including first and second plates, the coil connected in parallel with the capacitor, the first plate positioned adjacent to and coupled to a first living body; and
    a signal source configured to produce a generated communication signal used to drive the magnetic antenna to produce a generated near-field magnetic field and to drive the electric antenna to produce a generated near-field electric field,
    wherein the transmitter when positioned adjacent to and coupled to the first living body is configured to communicate with a receiver of the electromagnetic induction wireless communication system positioned adjacent to and coupled to a second living body,
    wherein the first and second living bodies are connected through skin contact, wherein the generated near-field electric field is coupled to the first and second living bodies, and wherein the generated near-field magnetic field passes through the first and second living bodies.

11. The electromagnetic induction wireless communication system of claim 10, the transmitter further comprising a tuning capacitor coupled to an antenna combination configured to tune the antenna combination, wherein the antenna combination includes the magnetic antenna and the electric antenna.

12. The electromagnetic induction wireless communication system of claim 10, wherein there is no galvanic connection between the transmitter and ground.

13. The electromagnetic induction wireless communication system of claim 10, further comprising a voltage control unit coupled to the signal source configured to produce one of an amplitude difference, phase difference, and an amplitude and a phase difference between communication signals used to drive the magnetic antenna and electric antenna.

14. The electromagnetic induction wireless communication system of claim 13, further comprising a controller including a data processing unit and signal processing unit, wherein the controller controls the operation of the voltage control unit.

15. The electromagnetic induction wireless communication system of claim 10, wherein the receiver comprises:
  a second magnetic antenna comprising a second coil;
  a second electric antenna comprising a second capacitor including first and second plates, the second coil connected in parallel with the second capacitor, the first plate of the second capacitor positioned adjacent to and coupled to the second living body; and
  a signal detector configured to detect a received communication signal from the transmitter via a received near-field magnetic field detected by the second magnetic antenna and a received near-field electric field detected by the second electric antenna, wherein the received near-field electric field is coupled to the first and second living bodies, and wherein the received near-field magnetic field passes through the first and second living bodies.

16. The electromagnetic induction wireless communication system of claim 15, wherein the receiver further comprises a tuning capacitor coupled to an antenna combination configured to tune the antenna combination, wherein the antenna combination includes the second magnetic antenna and the second electric antenna.

17. The electromagnetic induction wireless communication system of claim 15, wherein there is no galvanic connection between the receiver and ground.

18. The electromagnetic induction wireless communication system of claim 15, wherein the receiver further comprises a controller including a data processing unit and signal processing unit, wherein the controller controls the operation of the receiver.

19. The electromagnetic induction wireless communication system of claim 13, wherein the signal source comprises a first signal generator and a second signal generator, the first and second signal generators are configured to generate a balanced voltage signal applied to the magnetic antenna.

20. The electromagnetic induction wireless communication system of claim 19, wherein the voltage control unit is configured to produce a second voltage signal based on the balanced voltage signal, the second voltage signal applied to the electric antenna.

* * * * *